Figures 1, 5:
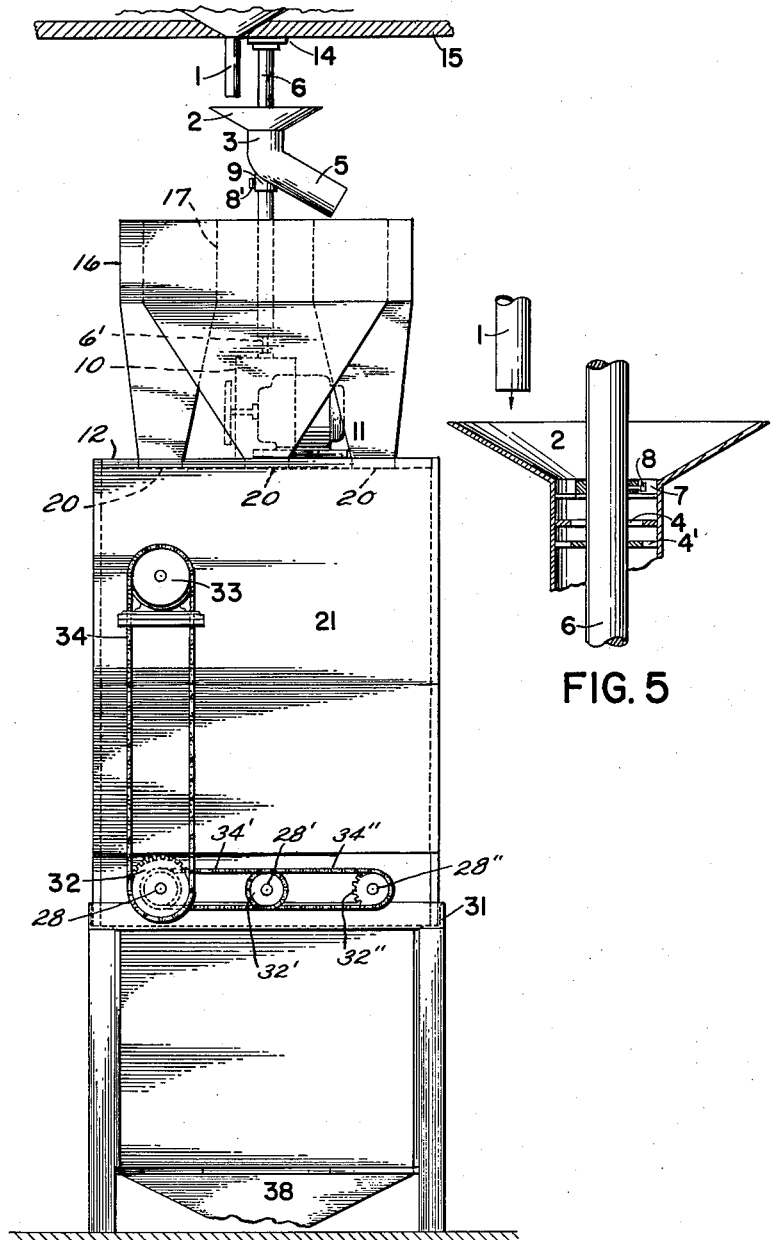

Sept. 10, 1963 L. A. WEINECKE ETAL 3,103,287
UNIFORM RESIDENCE HOPPER ASSEMBLY
Filed Dec. 14, 1961 4 Sheets-Sheet 1

L.A. WEINECKE
O.L. BREKKE
INVENTORS

BY R. Hoffman
ATTORNEY

Sept. 10, 1963   L. A. WEINECKE ETAL   3,103,287
UNIFORM RESIDENCE HOPPER ASSEMBLY
Filed Dec. 14, 1961   4 Sheets-Sheet 2

L.A. WEINECKE
O. L. BREKKE
INVENTORS

BY R. Hoffman
ATTORNEY

L. A. WEINECKE
O. L. BREKKE
INVENTORS

L. A. WEINECKE
O. L. BREKKE
INVENTORS

United States Patent Office 3,103,287
Patented Sept. 10, 1963

3,103,287
UNIFORM RESIDENCE HOPPER ASSEMBLY
Laurence A. Weinecke and Ordean L. Brekke, Peoria, Ill., assignors to the United States of America as represented by the Secretary of Agriculture
Filed Dec. 14, 1961, Ser. No. 159,471
4 Claims. (Cl. 214—17)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

This invention relates to a retention hopper combination capable of providing a predetermined tempering or residence time for freshly moistened corn kernels, other cereal grains, or for any other particulate matter that is continuously received from a first treatment step that also requires a predetermined "hold-up" period following the already given step before subjecting the particulate matter to a subsequent treatment step.

The pre-milling tempering or conditioning of stored whole grain cereals to provide moisture contents of about 15-24 percent as required for better degermination or milling of grain is fully conventional in the art. However, a brief exposure of corn kernels or other whole grain cereals to moisture does not per se result in sufficient immediate absorption of the moisture and proper internal distribution unless a tempering time is also given that will range from only a few minutes to as much as several hours, depending on the existing degree of dryness and moisture content of the particular lot of corn kernels, the employment of or absence of a wetting agent, desired moisture gradient, and other factors that are well understood by those skilled in the art.

In accordance with the elementary awareness that a uniform tempering time should be provided for all of the similarly moistened kernels from a given storage bin, batch tempering of shelled corn kernels in either a tank or in a conventional hopper is well known. It is also old to avoid the extensive and costly disadvantages of a batch process by continuously feeding fresh portions of corn into one part of a conventional tank or hopper while withdrawing at a different point although it is recognized that this is actually a comprise since it necessarily involves some mixing of successive kernels, thus resulting in nonuniform residence times and nonuniform tempering.

A primary object of our invention is a uniform retention hopper combination that will provide any predetermined residence time uniformly to all of the particles of a continuously admitted stream and will then discharge the particles in a continuous manner after they have been subjected to the uniform residence or delay.

A more specific object is a uniform residence time hopper combination that will accept a continuously provided stream of any particulate material requiring a predetermined and uniform hold-up or residence time and after so delaying the particles will discharge them in a continuous manner for the next treatment step.

A still more specific object is a hopper apparatus that will continuously receive a stream of freshly moistened but untempered or insufficiently tempered corn kernels from a spraying chamber or a tank and uniformly retain or delay all of the kernels for a predetermined residence interval so as to provide a highly uniform extent of tempering followed by discharge of the uniformly and properly tempered kernels in a continuous manner to one or more conveying devices or directly to one or more work pieces that will perform a next operation such as mechanical degermination.

A further object is a compact and easily constructed hopper combination requiring a minimum of space.

Still other objects and advantages will be apparent to one skilled in the art from the following detailed description and drawings.

The above and related objects are accomplished by the uniform retention hopper apparatus of the present invention, which broadly comprises in co-acting combination a vertically supported wide mouthed primary rotary funnel subassembly for continuously receiving a stream of substantially identical particulate matter such as freshly dampened kernels of corn or other cereal grain, a baffled vertical connecting tube integral therewith having opposed baffles or deflector plates for uniformly receiving by gravity the contents of the funnel component. The vertical connecting tube is provided with an integral rotary angled ejection spout that uniformly described a circular path which may be considered as constituting a smooth progression of successive arcuate segments or projections corresponding to the number of radially arranged funnel-like voids of a fixed means for continuously receiving and transmitting by gravity equal quantities of the kernels in the form of a separate stream to each of the corresponding chambers of the retention hopper. The fixed means just mentioned comprises radially arranged vertical voids or recesses formed by radially partitioning the vertical annular space present between two widely separated tubular elements that are concentric around the axis of rotation of the primary receiving and distributing means. Each so formed radial recess segment is downwardly integral with and continues as a funnel-like member so situated that its lower opening feeds the particulate matter by gravity directly into a corresponding retention chamber of the hopper, said hopper comprising a series of unilaterally biased, equal capacity, side by side retention chambers. The biased member and the opposing vertical insert or wall member of a chamber are close enough together at the bottom of a chamber to form thereat a transverse, narrow, slot-like opening. Directly beneath each slot-like opening in a sweeping and occluding relation thereto is a transverse, horizontally mounted rotary ejection subassembly comprising a suitably driven rotor element, the circumference of each said rotor element having integrally mounted thereon at least three and preferably four or more equally spaced transverse somewhat flexible vanes that are in sweeping relation to the slot-like opening of the chamber as well as to the essentially hemi-cylindrical walls of the chamber-supporting divider blocks below. Each adjacent pair of vanes forms a transverse pocket or trough that fills by gravity from the chamber when the trough is in a receiving position directly beneath the slot-like opening and then after a half-rotation empties by gravity into any suitable duct or conveyor that will feed the continuously ejected particles to one or several mechanical degermination or milling machines.

Figure 2:
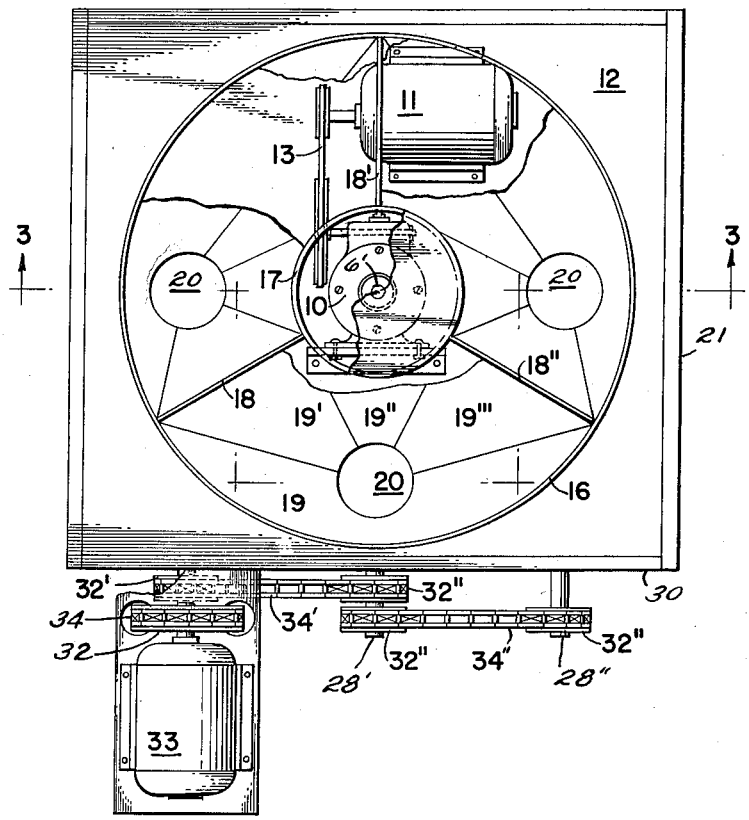
Figure 3:
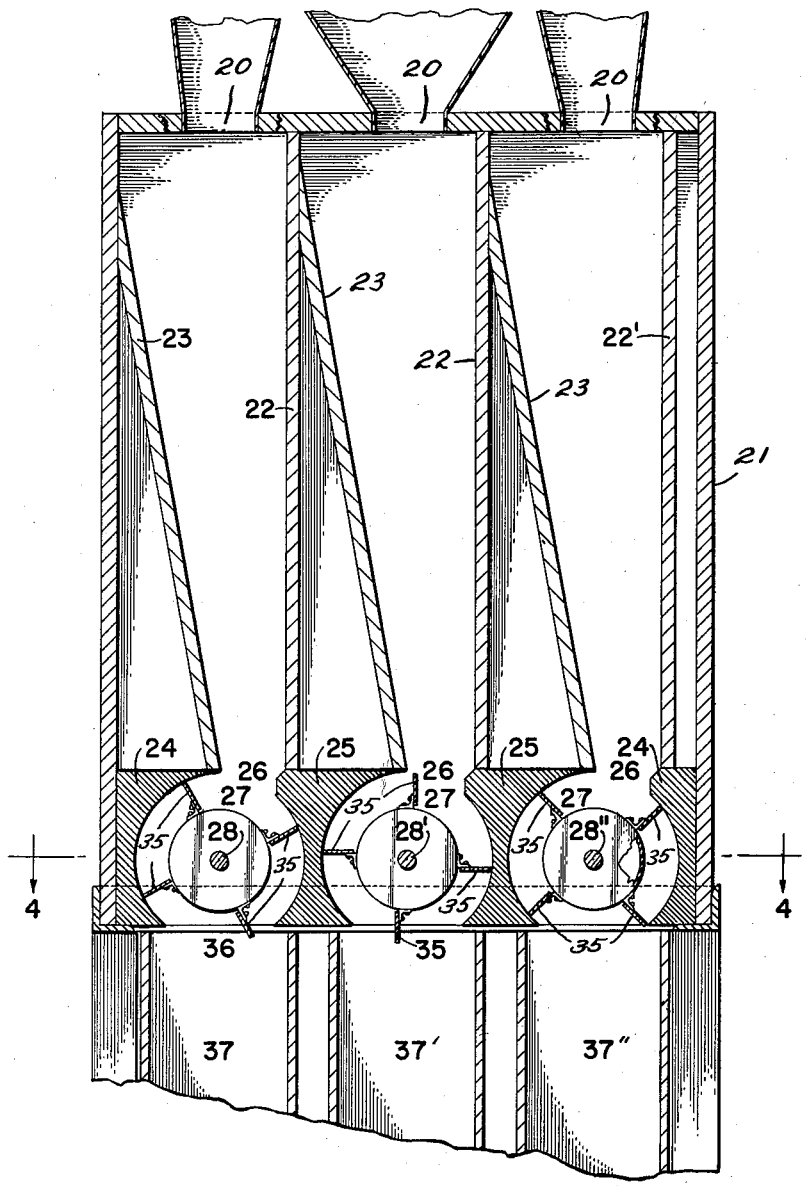
Figure 4:
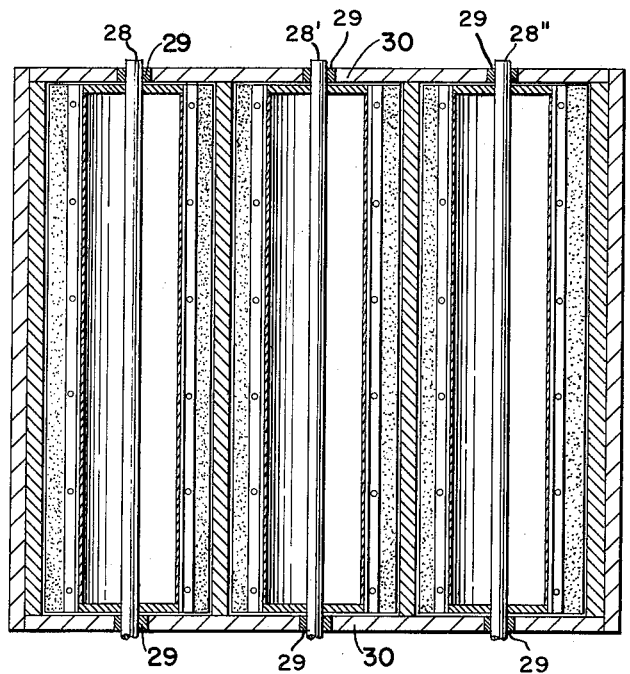

In the drawings FIGURE 1 is a front view of the combination, FIGURE 2 is a top view, with the portions broken away, emphasizing the fixed secondary receiving and distributing subassembly, FIGURE 3 is a vertical section along line 3—3' of FIGURE 2 but extending only from the lower end of the fixed receiving and distributing subassembly so as to emphasize the retention chambers and the vaned horizontal discharge rotor ejection means and discharge ducts, FIGURE 4 is a horizontal section along line 4—4' of FIGURE 3, and FIGURE 5 is an enlarged vertical section showing details of the primary receiving funnel construction of FIGURE 1.

With particular reference to FIGURE 1 which shows a schematic frontal view of our combination that may be fabricated from any suitable materials including metals, plastics, wood, and combinations thereof, and is electively supported off the floor or suspended from rafters (not shown) freshly moistened corn kernels fall from an eccentrically located external supply tube 1 into a primary receiving and distribution subassembly comprising a wide mouth funnel 2 that tapers sharply into and is integral with vertical connecting tube 3 containing opposed deflector or baffle plates 4 and 4'. The lower end of said connecting tube is integrally continuous with angled ejection spout 5 that inclines from the vertical by not more than the complement of the angle of repose. Funnel 2 and vertical connecting tube 3 are concentric to vertical rotary drive shaft 6 that extends through the lower wall of angled ejection spout 5 and is preferably made integral therewith, as by soldering. Vertical rotary drive shaft 6 is mechanically integral with funnel 2 through strutted spider 7 that is affixed to rotary drive shaft 6 by set-screw 8. Just below its point of penetration and emergence from the under surface of the angled ejection spout, vertical rotary drive shaft 6 is surrounded by lower support collar 9 having set-screw 8' from which point rotary drive shaft 6 continues down to meet and be coupled with the vertical drive shaft 6' of speed reducer 10 (see FIGURE 2) which is driven by electric motor 11 resting on platform 12 through V-belt drive 13 (see FIGURE 2). As already indicated, in its upward course vertical rotary drive shaft 6 is located axially within connecting tube 3 and funnel 2 out of which latter it then further extends to terminate in upper bearing 14 having support strut 15.

Inasmuch as angled ejection spout 5 is mechanically integral with rotary drive shaft 6 and is therefore capable of being rotated at a predetermined rate, the stream of kernels issuing from its open lower end describes a continuous series of equal arcuate paths that cause equal amounts of kernels to enter each of the radially-disposed segments of the fixed secondary receiving and distributing subassembly. As seen from FIGURE 2, the subassembly comprises an outer tubular member 16 and a concentric inner tubular member 17. The vertical annular space between these two members is equally subdivided by a plurality of radial partitions 18, 18', and 18'' that descend vertically to meet floor members 19, 19', 19'', and 19''' which slope from all sides to form, in each subdivision, a funnel having an outlet 20. Each outlet 20 terminates directly over corresponding unilaterally biased equal capacity hopper chamber 21, thus assuring an equal rate of delivery to each chamber.

As may be clearly seen in FIGURE 3, the box-like rectangular hopper is divided into a series, preferably at least three, of consecutive, equal capacity, unilaterally biased transverse chambers each of which is formed between a vertical partition member 22 and a biased baffle plate member 23, the upper margin of each respective baffle plate member abutting the upper margin of the adjoining chamber's vertical partition member at an angle of at least 10 degrees but less than the complement of the grain repose angle, thus preventing the formation of stagnant pockets. Terminal vertical partition 22' is required for equalizing the capacity of that chamber. The biased baffle plate members and the vertical partition members terminate at and rest on transverse, essentially hemispherically concave divider block members 24 and biconcave divider block members 25, in cooperation with which they define restricted, transverse, slot-like openings 26 leading directly to a respective horizontally disposed cylindrical recess 27.

Each of these cylindrical recesses is occupied by an ejection rotor subassembly consisting of horizontal rotor shafts 28, 28' and 28'' that are suitably mounted on bearing members 29 (see FIGURE 4) through hopper wall 30 resting on frame end-support 31. External to wall 30 and mechanically integral with horizontal ejection rotor shaft 28 is primary sprocket gear 32 of suitable size, driven by a combination electric motor and variable speed reducer 33 and primary drive chain 34. Also mechanically integral with horizontal rotor shaft 28 and external to primary sprocket gear 32 is a secondary sprocket gear 32' which transmits power to accessory horizontal ejection rotor shafts 28' and 28'' via secondary drive chains 34' and 35'' and accessory secondary sprocket gears 32'', the power train being so arranged as to provide rotation of each respective discharge rotor toward the presenting face of the corresponding compartment baffle.

The surface of each rotor has integral therewith at least three and preferably four or more equally spaced somewhat flexible transverse vanes 35 that extend just far enough from the surface to the rotor to be in sweeping relationship to slot-like opening 26 and to the curved surfaces of the divider blocks so that a rotor recess 27 that is formed between any successive pair of vanes will fill by gravity when in position beneath the slot-like opening, and, following a half rotation, will empty externally by gravity through discharge opening 36 into a respective discharge duct member 37, 37', or 37'' leading to a single or to a corresponding number of degerminators or other processing machines (not shown). Obviously, if a single mechanical degerminator or other machine is to receive the entire output of the retention hopper a funnel-like common discharge duct 38 is employed.

It will be understood that although the radially-segmented fixed funnel subassembly can be omitted when the hopper contains only two chambers, when there are three or more chambers the correspondingly segmented stationary funnel subassembly makes it possible to avoid positioning and other problems that would prevent the required precise fractionation of the original single stream of particulate matter to correspond with the number of chambers of the hopper.

To obtain the full operative function that is inherent in our uniform residence hopper combination it will be appreciated that the chambers must first be partially filled to a depth that will be calculated from considerations of chamber volume at that depth, the discharge volume from the horizontal rotors per unit time, and the desired retention time or delay. Having so determined the required depth in the chambers and registered the same (as by wax pencil mark on suitably transparent plastic windows) the operator can readily adjust the input and output to maintain the depth and thus the desired residence and tempering time.

We claim:
1. Apparatus for continuously receiving, uniformly detaining, and then continuously discharging to a succeeding operation partially processed particulate material that requires a predetermined detention period prior to said succeeding operation, said apparatus comprising:
  (a) a pair of superposed vertical receptacles, each containing the same number of a plurality of horizontally adjacent, vertical, open-top compartments, the compartments in at least the lower of the receptacles being of equal capacity, each of the compartments in the upper receptacle communicating with a corresponding compartment in the lower receptacle;
  (b) rotary distribution means above the upper receptacle adapted to successively distribute equal amounts of particulate material to each of the compartments of said upper receptacle; and
  (c) a plurality of similar expelling means, each adapted to operate at a predetermined uniform rate, connected to the lower end of the lower of the two receptacles, each compartment in said lower receptacle being provided with its own expelling means, said expelling means being interconnected for simultaneous operation.

2. An apparatus of the character described comprising:
  (a) a first vertical receptacle subdivided into a plurality of adjacent, horizontally-disposed, open-top, compartments, each of said compartments being provided with a funnel-like discharge opening at its bottom;
  (b) material distributing means mounted above the first vertical receptacle for rotation in a horizontal plane, said distributing means having a discharge opening and being so located that, on rotation at a uniform predetermined rate, said discharge opening will describe a circular path above the compartments, thereby to distribute equal amounts of material successively to each of said compartments;

(c) a second vertical receptacle below said first vertical chamber subdivided into a plurality of adjacent, equal capacity compartments equal in number to the compartments in the first vertical receptacle, each of said compartments in the second vertical receptacle communicating with a corresponding compartment in the first vertical receptacle by means of said funnel-like openings;

(d) exit means at the bottom of each compartment in said second vertical receptacle; and (e) means adjacent each of said exit means for simultaneously and continuously expelling material from said exit means at a uniform predetermined rate.

3. An apparatus of the character described comprising:

(a) a first vertical receptacle comprising a pair of open-top, concentric cylindrical members defining an annular space therebetween;

(b) a plurality of radial walls connecting said cylindrical members to form a plurality of adjacent open-top, circularly disposed segmented compartments in said annular space;

(c) a funnel-like member connected to the bottom of each compartment to provide a plurality of separate discharge openings in the bottom of said first vertical receptacle corresponding in number to the number of compartments;

(d) material distributing means mounted above the first vertical receptacle for rotation about a vertical axis concentric with said cylindrical members, said distributing means comprising a funnel-like element having secured thereto at its lower end an angularly, downwardly disposed discharge means terminating above the compartments of said first vertical receptacle;

(e) means connected to the distributing means for rotating said distributing means at a uniform and predetermined rate, thereby to cause the discharge means to describe a circular path over the top of the compartments of the first vertical chamber, passing successively over each compartment;

(f) a second open-top, vertical receptacle beneath the first vertical receptacle, said second receptacle being also open at the bottom and having a plurality of transverse, parallel, vertical partitions and a plurality of opposed biased baffle members downwardly converging toward said vertical partitions to form a plurality of adjacent, parallel, equal capacity, unilaterally biased compartments equal in number to the compartments in the first vertical compartment, the lower ends of the vertical partitions and biased members forming an elongated, narrow slot-like discharge opening at the bottom of each of parallel compartments, each of said parallel compartments communicating with a segmented compartment in the first vertical member by means of said funnel-like members at the bottom of said segmented compartments;

(g) a plurality of elongated, cylindrically concave support members under the second vertical receptacle so arranged that opposing concave surfaces form an open-top and open-bottom cylindrical passageway under and coextensive with each of said slot-like discharge openings and communicating therewith;

(h) transverse expelling means rotatably mounted in each of said cylindrical passageways; and (i) means for simultaneously rotating said transverse expelling means at a predetermined uniform rate.

4. The apparatus of claim 3 wherein each of the transverse expelling means comprises an elongated rotor element coextensive with the cylindrical passageway and a plurality of equally spaced, radially extending vanes coextensive with said rotor element and in contact relationship with the walls of the cylindrical passageway.

References Cited in the file of this patent

UNITED STATES PATENTS 1,542,380    Foster  ---------------- June 16, 1925

FOREIGN PATENTS 632,297    Germany  -------------- July 6, 1936